United States Patent [19]

Nelson, Jr. et al.

[11] Patent Number: 5,923,618

[45] Date of Patent: Jul. 13, 1999

[54] LEAP-SECOND CURE FOR 1999 GPS ROLLOVER PROBLEM

[75] Inventors: Robert Leonard Nelson, Jr.; Robert Clifford Bartmess, both of Austin, Tex.

[73] Assignee: Trimble Navigation Limited, Sunnyvale, Calif.

[21] Appl. No.: 08/748,014

[22] Filed: Nov. 12, 1996

[51] Int. Cl.$^6$ .......................... G04B 19/24; G04C 11/02; G04C 15/00

[52] U.S. Cl. ............................... 368/28; 368/47; 368/155

[58] Field of Search .............................. 368/101, 28–30, 368/62, 82, 156–157; 364/569, 705.07, 705.08

[56] References Cited

U.S. PATENT DOCUMENTS

| 4,768,178 | 8/1988 | Conklin et al. | 368/47 |
| 4,823,328 | 4/1989 | Conklin et al. | 368/47 |
| 5,220,333 | 6/1993 | Penrod | 368/47 |

*Primary Examiner*—Vit Miska
*Attorney, Agent, or Firm*—Donald S. Dowden; Cooper & Dunham LLP

[57] ABSTRACT

The timing system for GPS has a week counter that recycles at intervals of about 20 years. The first recycling will occur on Aug. 22, 1999, producing a time ambiguity in GPS signals. The invention employs a count of leap seconds to resolve the ambiguity and extends the useability of GPS in its present format by more than a century.

12 Claims, 4 Drawing Sheets

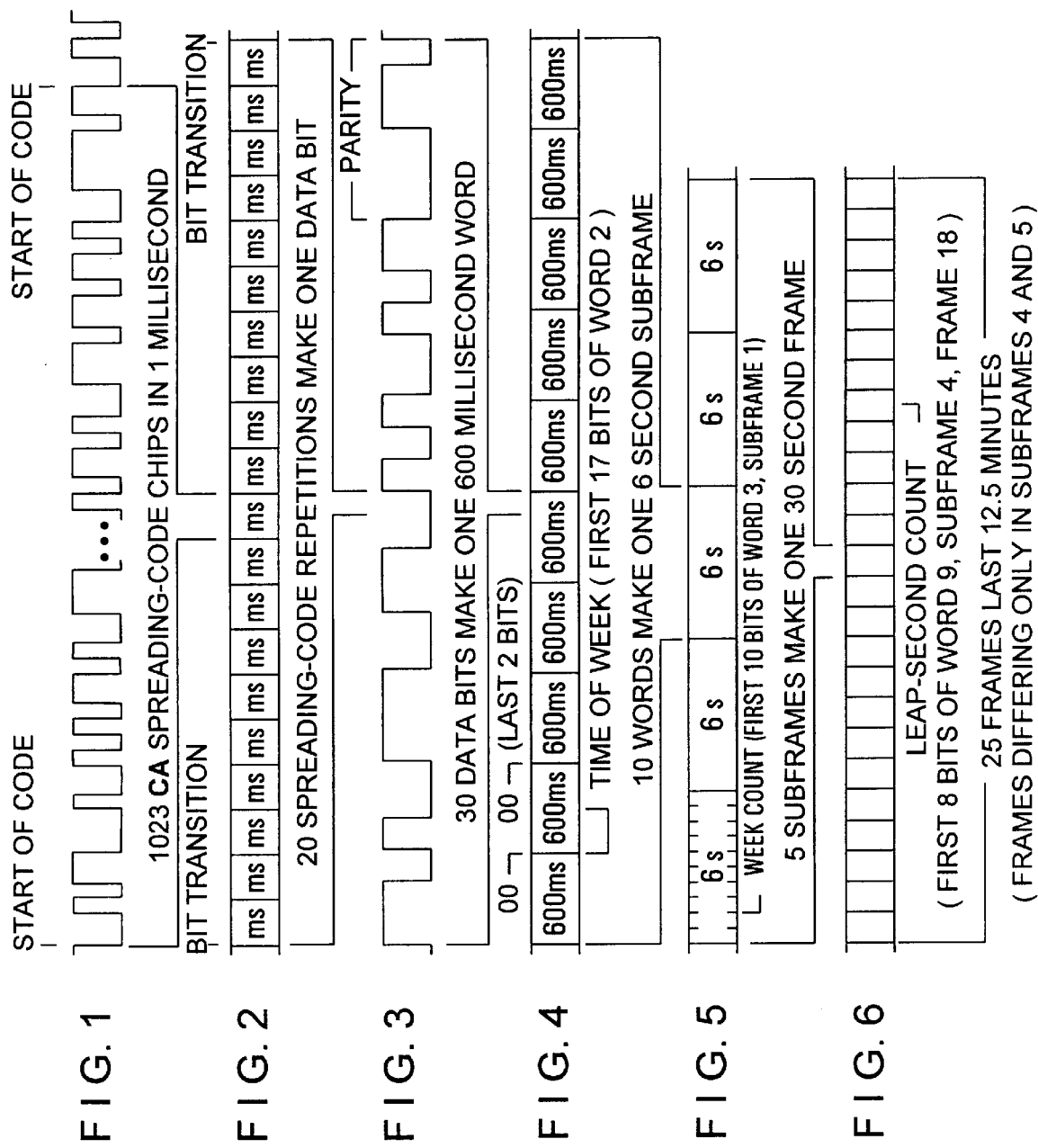

WEEKS: t = 84.55874 + 70.53509 × LEAP-SECOND COUNT

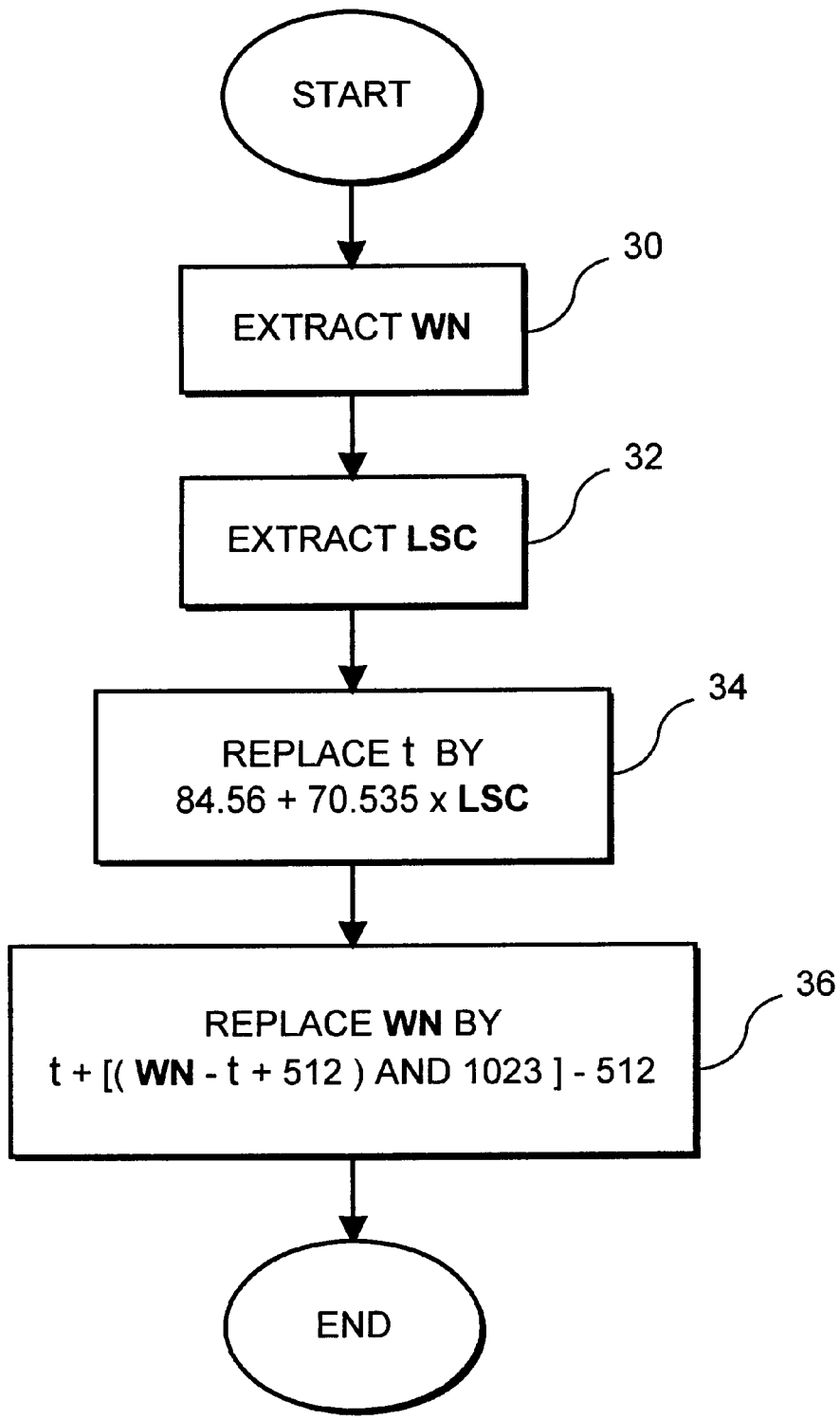
F I G. 10

LEAP-SECOND CURE FOR 1999 GPS ROLLOVER PROBLEM

BACKGROUND OF THE INVENTION

FIELD OF THE INVENTION

This invention relates to timekeeping and more particularly to a novel and highly effective timekeeping method and apparatus for solving a serious problem due to arise on Aug. 22, 1999. On that day, if no corrective action is taken in the meantime, the timekeeping signals provided by the most advanced navigation system in the world will become ambiguous.

Navigation, map-making and surveying have been revolutionized by the global positioning system, or GPS, provided by the U.S. Government and to a lesser extent by GLONASS, a satellite navigation system provided by the Russian Government. A European satellite navigation system is planned but not yet operational. GPS and other satellite navigation systems enable a determination of one's position and velocity speedily, accurately, automatically, and inexpensively.

The principles of satellite navigation are well known and will not be described in detail here. Those interested in the details can refer to a number of reference works, including GPS Theory and Practice, by B. Hofmann-Wellenhof, H. Lichtenegger, and J. Collins, Springer-Verlag, Vienna and New York, third edition, 1994.

In broad outline, satellite navigation works as follows (for convenience, GPS is summarized, but the principles apply to satellite navigation systems generally): Since Jan. 6, 1980, as many as two dozen GPS satellites have been in various earth orbits at a height of about 20,000 kilometers (see FIG. 8, which represents four such satellites S, a ground-based receiver R, and Earth E). Each satellite carries an atomic clock accurate to one second in several million years. The satellites, while of course always moving, are distributed around the earth so that typically seven or more are well above the horizon as seen from any point on or near the earth. The satellites transmit line-of-sight signals, so that, absent obstruction by mountains, buildings, etc., one can expect always to be able to receive signals from about seven satellites, regardless of one's location (on or near the earth). For a "complete" fix (time, longitude, latitude and elevation relative to sea level), a receiver, which can be in a car, on a plane, aboard a ship, hand-held, etc., must receive signals from at least four satellites. For a fix that dispenses, for example, with a readout of elevation, reception of signals from three satellites suffices. For a determination of time, a signal from one satellite suffices (if the receiver location is accurately known, the time signal carries full GPS accuracy; if the receiver location is not known, the time error is at most 21 ms).

Each GPS signal is encoded to indicate the time of transmission from the satellite and has several portions, including a coarse acquisition or CA code, a precise or P code, a portion representing a count of weeks since the inauguration of the GPS system on Jan. 1, 1980, and a data portion giving the satellite's status and orbital parameters.

Time is encoded on the CA code modulo 1 millisecond (1 ms) and on the P code modulo 1 week. All GPS receivers can receive and use the CA code, but the P code is encrypted and requires for its use decryption software available only to the U.S. military. Use of the P code gives a move precise fix, but GPS receivers without the decryption software can use the data portion of the signal, which gives the satellite's status and orbital parameters, to approximate closely the week boundaries. Thus all users of the GPS system can obtain and use a signal from each satellite sufficient to enable software in the receiver to calculate a fix rapidly and accurately.

However, the week count is encoded using only ten bits and is thus capable of a maximum count of $2^{10}=1024$. In other words, 1024 weeks after the inauguration of the system on Jan. 6, 1980—i.e. on Aug. 22, 1999—, the week count will cycle from 1111111111 to 0000000000. As matters now stand, there will be nothing in the GPS data to tell explicitly that the year is in fact 1999 and not 1980.

If no corrective action is taken, this will cause problems with both navigation and timekeeping. The navigation problem arises from the need to relate dated satellite orbit information to the almanacs and ephemerides that inform the receiver of the satellites' positions. Here the difficulty is simply to relate the data and computations for the old week 1023 to the new week 1024, which is encoded not as "week 1024" but as "week 0". It is a simple computational matter to interpret the differences between week numbers as being in the interval, for example, −512 through +511, rather than the interval 0 through 1023, and thus avoid completely any disruption to navigation during the rollover.

The timekeeping problem is more difficult. Several solutions have been suggested. One is to design the system not to tolerate any date before it was manufactured, but rather to add the necessary multiple of 1024 weeks. That is satisfactory only for an additional 19.6 years; beyond that, the required multiple is ambiguous, and the rollover problem will arise again early in the year 2019.

Another possibility is to save the current date in nonvolatile memory. This converts the 20-year life into a more acceptable 20-year shelf life. However, it introduces a vulnerability to a mistaken date. For example, if the system is programmed never to allow time to run backward, erroneously decodes a date, places it in the future as instructed, and then decodes the true date, it will place the true date in the future from the false date and always show a net advance of 19.6 years. Variations on the date algorithm that allow backward time changes can recover the correct date after an error, but not reliably.

Another solution is to include a separate clock in each of the (myriad) receiving systems. This requires also adding to each receiver an uninterrupted source such as a battery to power the clock, since the clock must always be maintained, even during periods of nonuse. Although a clock in the receiver need not have high accuracy, a requirement for a local clock in each receiver adds to the cost, size and weight and is not a good solution to the rollover problem.

In principle, the rollover problem can be neatly solved by changing the GPS data format to encode the week count using more bits. That, however, would require a major revamping of the GPS system—a project that, because of the risk of confusing existing receivers, has not been, and perhaps should not be, undertaken.

What is needed is a solution that is sure to work for rather more than twenty years, using no external real-time clocks, nonvolatile memories, or user inputs.

OBJECTS AND SUMMARY OF THE INVENTION

An object of the invention is to remedy the problem outlined above and in particular to provide a solution to the 1999 GPS rollover problem. Another object of the invention is to solve the problem for an extended period of time using no external real-time clocks, no nonvolatile memories, and no user inputs.

The foregoing and other objects are attained in accordance with one independent aspect of the invention by providing a timing system comprising timing means that recycles at predetermined intervals equal to or longer than intervals between leap seconds and means employing a count of leap seconds to resolve the time ambiguity due to recycling of the timing means.

Other independent aspects of the invention are set out in the following specification and claims.

BRIEF DESCRIPTION OF THE DRAWING

A better understanding of the objects, features and advantages of the invention can be gained from a consideration of the following detailed description of the preferred embodiment thereof, in conjunction with the appended figures of the drawing, wherein:

FIG. 1 is a diagram of 1023 CA spreading-code chips, each having a duration of less than 1 microsecond (1 μs), forming a CA (coarse acquisition) spreading code having a duration of 1 millisecond (1 ms) and tracking time modulo 1 ms;

FIG. 2 is a diagram of 20 repetitions of the CA spreading code to make a data or parity bit having a duration of 20 ms and tracking time modulo 20 ms;

FIG. 3 is a diagram of 30 data/parity bits grouped to form a word having a duration of 600 ms and tracking time modulo 600 ms;

FIG. 4 is a diagram of 10 words grouped to form a subframe having a duration of 6 seconds, tracking time modulo 6 seconds, and employing the first 17 bits of word 2 to give the time modulo 1 week;

FIG. 5 is a diagram of 5 subframes grouped to form a frame having a duration of 30 seconds, tracking time modulo 30 seconds, and employing the first 10 bits of word 3, subframe 1, to give the time modulo 1024 weeks;

FIG. 6 is a diagram of 25 frames grouped to form a page having a duration of 12.5 minutes, tracking time modulo 12.5 minutes, and employing the first 8 bits of word 9, subframe 4, frame 18, to give a leap-second count;

FIG. 10 is a flowchart representing software for implementing the invention.

DESCRIPTION OF THE PREFERRED EMBODIMENT

Figure 7:
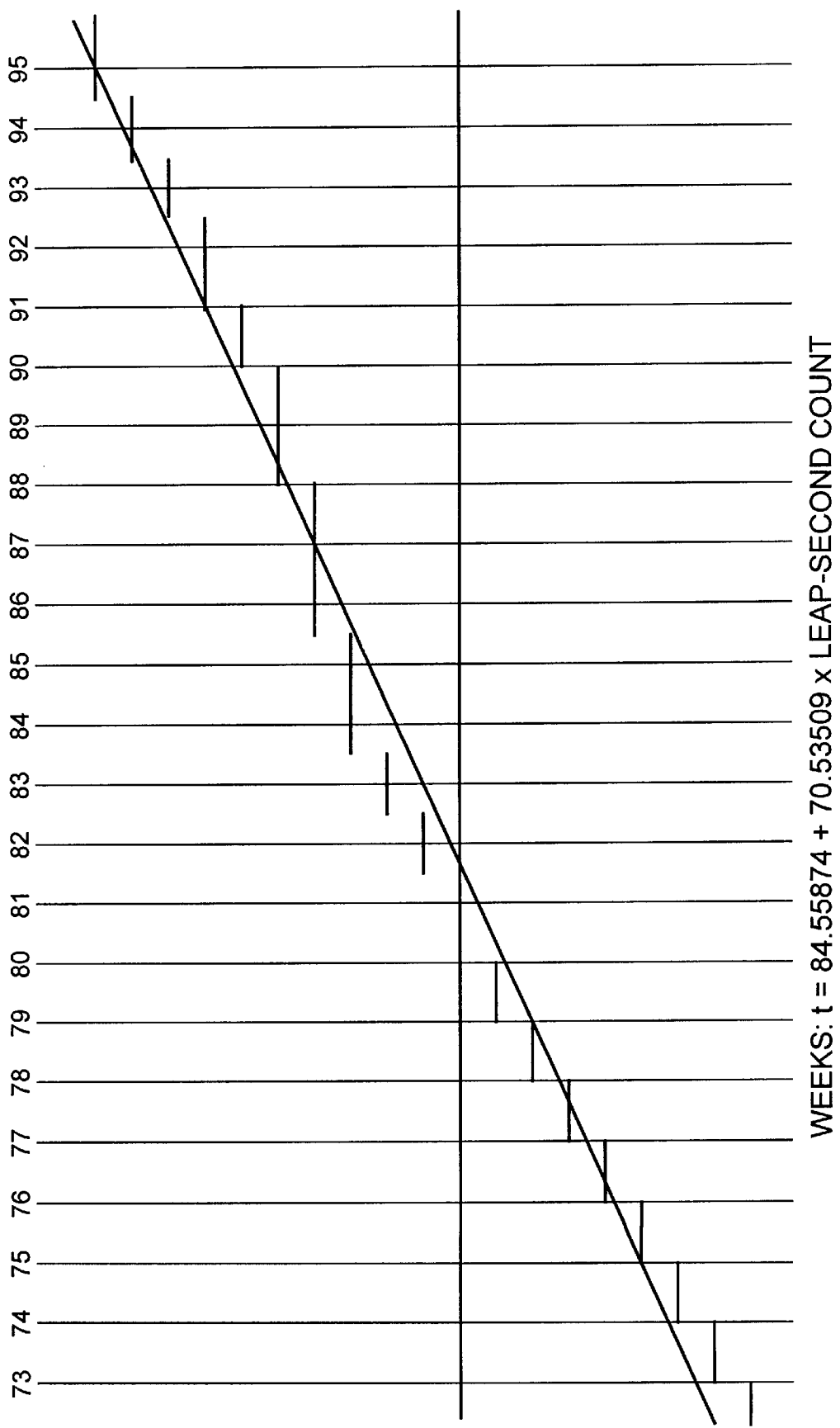
FIG. 7 is a graph representing a least-squares fit of a straight line to the historical count of leap seconds during the period 1973–1995.
Figure 8:
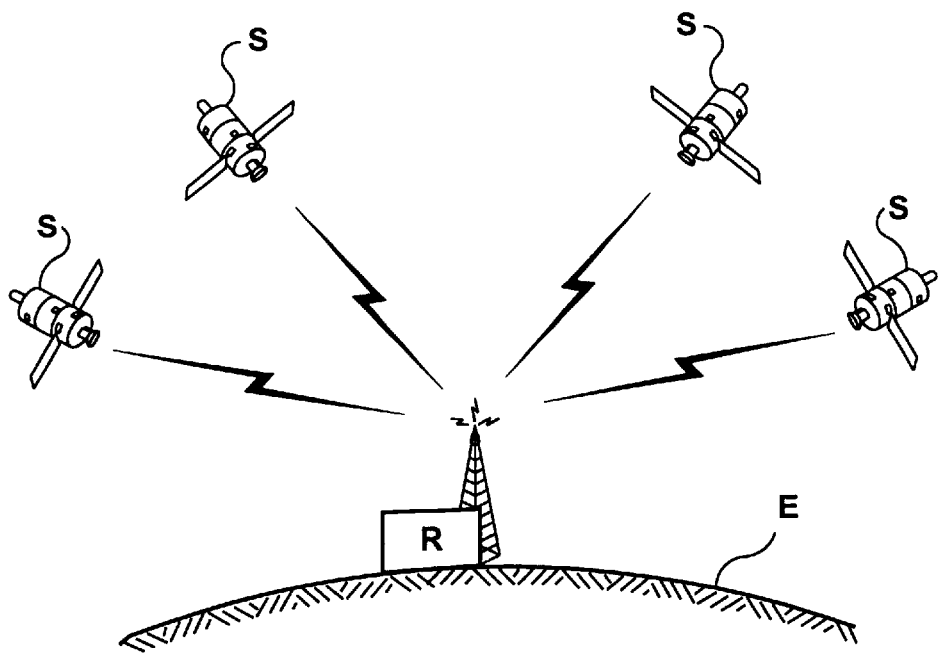
FIG. 8 is a diagram of navigation satellites in orbit about the earth and transmitting GPS signals to a receiver.

The sun and moon, principally the moon, exert a tidal pull on the earth that gradually has slowed its rotation. The earth's corresponding pull on the much smaller moon has in fact synchronized the moon's rotation about its axis with its orbit about the earth, so that a "day" on the moon lasts for a lunar month, and the moon always presents essentially the same face towards the earth, albeit from a given spot on the earth it is possible at certain times to peer slightly around one limb and at other times around another limb of the moon because of the moon's slightly eccentric orbit and its excursions from the plane of the ecliptic. The recently discovered discrepancy between the rate of rotation of the earth's core and mantle (the core rotates faster) may be a manifestation of the same tidal phenomenon.

The atomic second was defined in 1967 based on the ephemeris second as observed between 1956 and 1965. Before 1972, the second had been periodically lengthened to keep time synchronized with the earth's slowing rotation. Since then, the duration of the second has been held constant, and leap seconds have been inserted into the stream of time by international agreement. The insertions occur at the end of June or December in coordinated universal time (UTC) and keep UTC in sync with the earth's rotation. Negative leap seconds are provided for but have never been used. A leap second has been inserted about every year and a half, on the average.

The rate at which leap seconds have been added has varied little over the time during which they have been used. Because of the disruption that would be caused by including leap seconds in the GPS format, they have been ignored in GPS time. Thus there has been an increasing discrepancy between GPS time as encoded in the GPS signals and UTC. To allow this to be corrected, a separate leap-second count is included in the GPS data message as a signed number encoded in 8 bits. The present invention uses the count of leap seconds to solve the rollover problem by disambiguating the week count as explained below.

FIG. 1 is a diagram of 1023 CA spreading-code chips, each having a duration of less than 1 μs, forming a CA (coarse acquisition) spreading code having a duration of 1 ms and tracking time modulo 1 ms. The dots in FIG. 1 indicate that a portion is omitted. The waveform illustrated is merely an example; it will in general be different. The code repeats at intervals of 1 ms. The internal design of the code makes it possible to track time to the nearest millionth of a second, and by detecting the chip boundaries it is possible to determine time much more precisely than that; but since the code recycles at intervals of 1 ms, it is not possible, using the code of FIG. 1 alone, to obtain a complete indication of time.

FIG. 2 is a diagram of 20 repetitions of the CA spreading code to make a bit having a duration of 20 ms and tracking time modulo 20 ms. The bit of FIG. 2 can represent a part of a data signal or a part of a parity signal.

FIG. 3 is a diagram of 30 data/parity bits grouped to form a word having a duration of 600 ms and tracking time modulo 600 ms. The first 24 bits encode data; the last 6 are parity bits. A "1" is distinguished from a "0" by the level of the signal. FIG. 3 represents 110100111001100101001011000110. This is of course merely an example; the signal will in general represent other values.

FIG. 4 is a diagram of 10 words grouped to form a subframe having a duration of 6 seconds, tracking time modulo 6 seconds, and employing the first 17 bits of word 2 to give the time modulo 1 week. Thus the time of week is repeated at intervals of 6 seconds.

FIG. 5 is a diagram of 5 subframes grouped to form a frame having a duration of 30 seconds, tracking time modulo 30 seconds, and employing the first 10 bits of word 3, subframe 1, to give a week count. Thus the week count is repeated at intervals of 30 seconds. However, since only 10 bits are devoted to representing the week count, the number of weeks that can be counted is $2^{10}$=1024. The GPS system was inaugurated Jan. 6, 1980. During the first week of its operation, the week count was encoded as 0000000000. During the week ending Aug. 22, 1999, the week count will be 1111111111. At the end of that week, namely on Aug. 22, 1999, the week count will cycle back to 0000000000, and there will be nothing in the GPS data to tell explicitly that the year is in fact 1999 and not 1980.

FIG. 6 is a diagram of 25 frames grouped to form a page having a duration of 12.5 minutes, tracking time modulo 12.5 minutes, and employing the first 8 bits of word 9, subframe 4, frame 18, to give a leap-second count. The leap-second count is already being transmitted by GPS satellites, albeit, as noted above, for a different purpose: to reconcile GPS time with UTC. In accordance with the present invention, leap-second information, which is already available, is employed to solve the rollover problem.

FIG. 7 is a graph representing a least-squares fit of a straight line to the historical count of leap seconds during the period 1973–1995. As the graph shows, about every 1.5 years on average the count of leap seconds has been incremented by 1. More precisely, the relationship as determined by a least-squares fit of a straight line to the data is substantially $$t=84.56+70.535*LSC,$$

where

LSC is a leap-second count and t is time in weeks since Jan. 6, 1980, inferred from LSC.

This equation is easily implemented in a GPS receiver (FIG. 9) by the software commands (FIG. 10):

Replace t by 84.56+70.535*LSC,

Replace WN by t+[(WN−t+512) AND 1023]−512, where LSC is a leap-second count as read from a GPS data message, WN is a GPS week number, both as read from the GPS data message and after correction by t, and "AND" is a bitwise logical operation.

Figure 9:
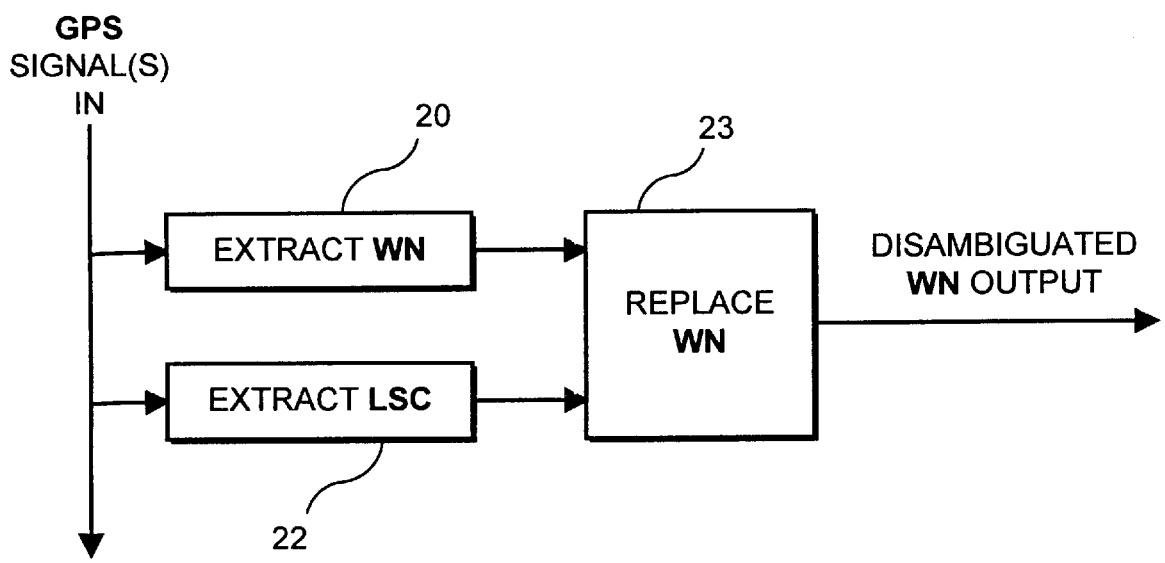
FIG. 9 is a schematic view of circuitry for implementing the invention.

FIG. 9 shows the GPS signals from, for example, 1 to 4 satellites, from which the week number WN is extracted at 20 and the leap second count LSC is extracted at 22. At box 23, the week number count is replaced in accordance with the software commands of FIG. 10. At step 30 of FIG. 10, the week number count WN is extracted from the GPS signal or signals. At step 32, the leap second count LSC is similarly extracted. At step 34, the command Replace t by 84.56+70.535* LSC is executed, and at step 36 the command Replace WN by t+[(WN−t+512) AND 1023]−512 is executed.

As FIG. 6 shows, the leap-second count is represented by the first 8 bits of word 9, subframe 4, frame 18. The leap-second count is signed, leaving 7 bits to represent the absolute value. Thus the absolute value of the count can go as high as $2^7=128$. The sign bit considered, the leap-second count is restricted to the interval −128 through +127. The system proposed herein, employing the least-squares fit discussed above (in accordance with which the count of leap seconds is incremented about every 1.5 years), provides a solution to the GPS rollover problem for about 173 years.

Thus there is provided in accordance with the invention a novel and highly effective solution to the 1999 GPS rollover problem. The solution provided in accordance with the invention is good for an extended period of time using no external real-time clocks, clock batteries or nonvolatile memories in the receivers, no user inputs, and no change in the format of GPS signals. While the invention in its preferred embodiment corrects a rollover problem inherent in the GPS system, it can be used in any other satellite navigation system having a similar rollover problem and indeed in any timing system that recycles at predetermined intervals equal to or longer than intervals between leap seconds.

Many modifications of the preferred embodiment of the invention disclosed above will readily occur to those skilled in the art. The invention includes all such modifications as fall within the scope of the appended claims.

We claim:

1. A timing system comprising timing means that recycles at predetermined intervals equal to or longer than intervals between leap seconds and means employing a count of leap seconds to resolve time ambiguity due to recycling of the timing means.

2. A timer comprising first storage means that stores a first count that is periodically incremented and recycles at predetermined intervals equal to or longer than intervals between leap seconds, thereby giving rise to an ambiguous relation between the first count and time;

second storage means that stores a second count of leap seconds; and disambiguating means responsive to the first and second counts and using the second count to disambiguate the relation of the first count to time.

3. A timer according to claim 2 wherein the first count has an incremental period of one week and a modulus of 1024.

4. A satellite navigation system comprising at least one satellite and at least one receiver, the satellite transmitting a signal and the receiver receiving the signal;

the signal comprising a first portion representing a first count that is periodically incremented and recycles at predetermined intervals equal to or longer than intervals between leap seconds, thereby giving rise to an ambiguous relation between the first count and time; and a second portion representing a second count of leap seconds; and the receiver comprising disambiguating means responsive to the first and second portions of the signal and using the second portion of the signal to disambiguate the relation to time of the first count as represented by the first portion of the signal.

5. A GPS system according to claim 4 wherein the first count is incremented weekly and recycles every 1024 weeks.

6. A GPS system comprising at least four satellites and at least one GPS receiver, each satellite transmitting a separate GPS signal and the receiver receiving each signal;

each signal comprising a first portion representing a first count that is periodically incremented and recycles at predetermined intervals equal to or longer than intervals between leap seconds, thereby giving rise to an ambiguous relation between the first count and time; and a second portion representing a second count of leap seconds; and the receiver comprising disambiguating means responsive to the first and second portions of each signal and using the second portion of each signal to disambiguate the relation to time of the first count as represented by the first portion of the same signal.

7. In a GPS system, the improvement comprising ten-bit means for counting weeks since Jan. 6, 1980, modulo 1024, giving rise to an ambiguity of almost 20 years on Aug. 22, 1999; and means employing a count based on leap seconds to resolve the ambiguity.

8. A method comprising the steps of measuring time, modulo 1024 weeks, from Jan. 6, 1980;

generating an expected count of leap seconds employed to synchronize GPS time with UTC; and employing the count of leap seconds to resolve the time ambiguity otherwise occurring on Aug. 22, 1999.

9. A method according to claim 8 wherein the step of generating comprises the step of finding a least-squares fit of a straight line to the count of leap seconds.

10. A method according to claim 9 wherein the least squares fit is substantially $$t=84.56+70.535*LSC,$$

where

LSC is a leap-second count and t is time in weeks since Jan. 6, 1980, inferred from LSC.

11. A method of resolving time ambiguity in a GPS system, comprising the steps of transmitting a GPS signal from each of a plurality of satellites, each signal including
 a digital CA code representing time modulo 1 millisecond and enabling signal acquisition;
 digital data with standard bit boundaries and format giving the orbital parameters of the transmitting satellite and enabling a time measurement modulo one week;
 a week number encoded in 10 bits; and
 a signed leap second count encoded in 8 bits; and employing the leap second count to resolve the ambiguity due to recycling of the week count to 0000000000 following a week count of 1111111111.

12. A method comprising the steps of measuring time, modulo 1024 weeks, from Jan. 6, 1980;

generating an expected count of leap seconds employed to synchronize UTC with GMT; and employing the count of leap seconds to resolve the time ambiguity otherwise occurring on Aug. 22, 1999;

wherein the step of generating comprises the step of finding a least-squares fit of a straight line to the count of leap seconds;

wherein the least squares fit is substantially $$t=84.56+70.535*L.C.,$$

where

L.C. is a leap-second count and t is time in weeks since Jan. 6, 1980, inferred from L.C.; and wherein the following algorithm is employed:

Replace t by 84.56+70.535*L.C.,

Replace WN by t+((WN−t+512) AND 1023)−512, where

L.C. is a leap-second count as read from a GPS data message,

WN is a GPS week number, both as read from the GPS data message and after correction by t, and "AND" is a bitwise logical operation.

* * * * *